United States Patent [19]  
White

[11] 3,852,242  
[45] Dec. 3, 1974

[54] METHOD FOR MAKING POLYETHERIMIDE
[75] Inventor: Dwain M. White, Schenectady, N.Y.
[73] Assignee: General Electric Company, Schenectady, N.Y.
[22] Filed: Dec. 3, 1973
[21] Appl. No.: 421,262

[52] U.S. Cl....... 260/47 CZ, 260/47 CP, 260/78 TF
[51] Int. Cl............................................. C08g 20/32
[58] Field of Search......... 260/47 CZ, 47 CP, 78 TF

[56] References Cited  
UNITED STATES PATENTS

| | | | |
|---|---|---|---|
| 3,729,446 | 4/1973 | Holub et al. | 260/47 |
| 3,740,378 | 6/1973 | Crivello | 260/78 |

Primary Examiner—Lester L. Lee  
Attorney, Agent, or Firm—William A. Teoli; Joseph T. Cohen; Jerome C. Squillaro

[57] ABSTRACT

A method is provided for making polyetherimide from certain bis(nitrophthalimide) and alkali diphenoxides. Higher polyetherimide intrinsic viscosity is achieved if the alkali diphenoxide is employed as a preformed substantially anhydrous reaction product of a diphenoxide and a sodium alkoxide in a $C_{(1-3)}$ alkanol.

7 Claims, No Drawings

METHOD FOR MAKING POLYETHERIMIDE

The present invention relates to a method for making polyetherimide involving the reaction of certain bis(nitrophthalimide) and alkali diphenoxides.

There is described in the copending application of Heath and Wirth, Ser. No. 177,166, filed Sept. 1, 1971, and assigned to the same assignee as the present invention, a method for making bis(nitrophthalimide)s of the formula, (I) 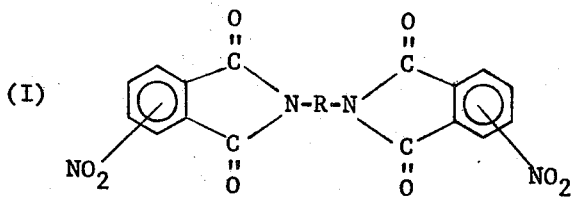

by effecting reaction between organic diamine of the formula
$NH_2$-R-$NH_2$,
and a nitro-substituted aromatic anhydride of the formula,

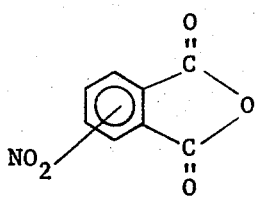

As taught in Ser. No. 177,166, a ratio of about 1 mole of organic diamine, per two moles of aromatic anhydride will produce a bis(amide-acid) which can be subsequently dehydrated to the bis(nitrophthalimide) of formula I, where R is a divalent organic radical selected from the class consisting of (a) aromatic hydrocarbon radicals having from 6–20 carbon atoms and halogenated derivatives thereof, (b) alkylene radicals and cyclo-alkylene radicals having from 2–20 carbon atoms $C_{(2-8)}$ alkylene terminated polydiorganosiloxane, and (c) divalent radicals included by the formula,

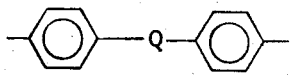

where Q is a member selected from the class consisting of —O—,

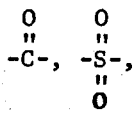

—S—, and —$C_xH_{2x}$—, and $x$ is a whole number from 1 to 5 inclusive.

Experience has shown that when substantially equal moles of the bis(nitrophthalimide) of formula I, and alkali metal diphenoxide of the formula,
    $MOR^1OM$      II.
is contacted in the presence of dipolar aprotic solvent at temperatures up to 80°C, polyetherimide is formed consisting essentially of the following chemically combined units,

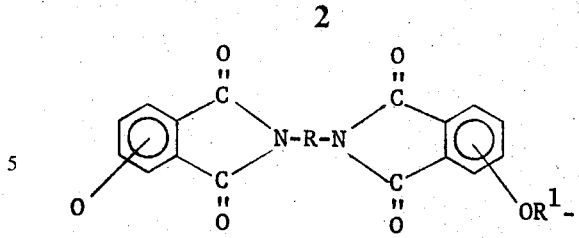

where R is as previously defined and $R^1$ is an aromatic radical having from 6–30 carbon atoms. $R^1$ is more particularly aromatic radicals selected from the class consisting of (a) the following divalent organic radicals:

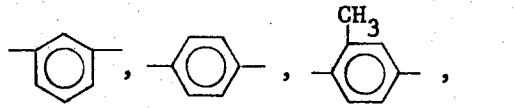

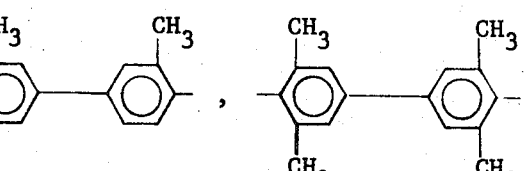

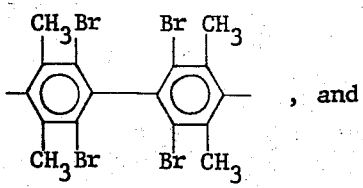

, and

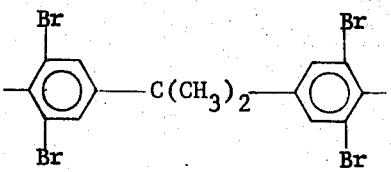

and (b) divalent organic radicals of the general formula

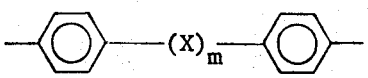

where X is a member selected from the class consisting of divalent radicals of the formulas —$C_yH_{2y}$—,

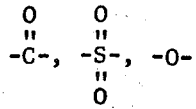

—O— and —S—, where $m$ is 0 or 1, $y$ is a whole number from 1 to 5.

The alkali metal diphenoxides of formula II are well known and include for example, the disodium salt of 2,2-bis(4-hydroxyphenyl)propane, the disodium salt of 4,4'-dihydroxybiphenyl, the disodium salt of 4,4'-dihydroxydiphenyl sulfone, the dipotassium salt of 4,4'-dihydroxydiphenyl sulfide, etc. These alkali metal diphenoxides can be made by effecting reaction between an alkali metal hydroxide and a dihydric phenol. For example, the alkali metal salt of bisphenol-A can be obtained by reacting two moles of sodium hydroxide per mole of bisphenol-A. Again, alkali metal diphenoxides also can be made by adding 0.58 part of fresh cut sodium metal to 75 parts of anhydrous methanol, with a magnetic stirrer under a nitrogen atmosphere. There is added to the mixture at the termination of the sodium reaction, 2.875 parts of bisphenol-A followed by evaporating the resulting solution to dryness. There is obtained a white solid upon drying the mixture further at 100°C.

Dihydric phenols which can be used to make the alkali metal diphenoxides of formula III are, for example,
  2,2-bis(2-hydroxyphenyl)propane;
  2,4'-dihydroxydiphenylmethane;
  bis(2-hydroxyphenyl)methane;
  2,2-bis(4-hydroxyphenyl)propane, hereinafter identified as "bisphenol-A" or "BPA";
  1,1-bis(4-hydroxyphenyl)ethane;
  1,1-bis(4-hydroxyphenyl)propane;
  2,2-bis(4-hydroxyphenyl)pentane;
  3,3-bis(4-hydroxyphenyl)pentane;
  4,4'-dihydroxybiphenyl;
  4,4'-dihydroxy-3,3',5,5'-tetramethylbiphenyl;
  2,4'-dihydroxybenzophenone;
  4,4'-dihydroxydiphenyl sulfone;
  2,4'-dihydroxydiphenyl sulfone;
  4,4'-dihydroxydiphenyl sulfoxide;
  4,4'-dihydroxydiphenyl sulfide;
  hydroquinone;
  resorcinol;
  3,4'-dihydroxydiphenylmethane;
  4,4'-dihydroxybenzophenone;
  and 4,4'-dihydroxydiphenyl ether.

Included by the above-described organic diamines are
  m-phenylenediamine;
  p-phenylenediamine;
  4,4'-diaminodiphenylpropane;
  4,4'-diaminodiphenylmethane;
  benzidine;
  4,4'-diaminodiphenyl sulfide;
  4,4'-diaminodiphenyl sulfone;
  4,4'-diaminodiphenyl ether;
  1,5-diaminonaphthalene;
  3,3'-dimethylbenzidine;
  3,3'-dimethoxybenzidine;
  2,4-bis(β-amino-t-butyl)toluene;
  bis(p-β-amino-t-butylphenyl)ether;
  bis(p-β-methyl-o-aminopentyl)benzene;
  1,3-diamino-4-isopropylbenzene;
  1,2-bis(3-aminopropoxy)ethane;
  m-xylylenediamine;
  p-xylylenediamine;
  2,4-diaminotoluene;
  2,6-diaminotoluene; etc.

Although the above-described polyetherimide can be used in a variety of applications requiring the service of high performance materials, particularly as an injection molding plastic, the intrinsic viscosity of the polyetherimide is often below 0.3 in dimethylformamide at 25°C. Experience has shown that the elongation at break of injection molded test samples having an intrinsic viscosity less than about 0.35 is often unsatisfactory. It would be desirable to make polyetherimide having an intrinsic viscosity of up to about 0.6 in dimethylformamide at 25°C and preferably from about 0.35 to 0.6 to provide superior injection molding materials.

The present invention is based on the discovery that polyetherimide having an intrinsic viscosity of up to about 0.6 can be made if bis(nitrophthalimide) of the formula

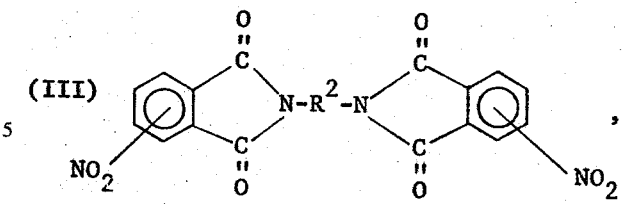

where $R^2$ is a divalent aromatic organic radical included within the definition of R above, is reacted at temperatures up to 80°C in the presence of a dipolar aprotic organic solvent with at least an equal molar amount of a preformed alkali metal diphenoxide dry powder reaction product of a sodium alkoxide and a dihydric phenol in the presence of a $C_{(1-3)}$ alkanol.

There is provided by the present invention, a method for making polyetherimide having an intrinsic viscosity of up to about 0.6 in dimethylformamide at 25°C and consisting essentially of chemically combined units of the formula,

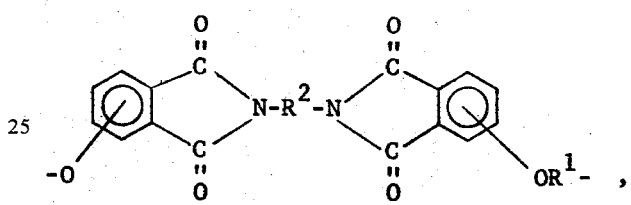

where $R^1$ and $R^2$ are as previously defined, which comprises, 1. effecting reaction at temperatures up to 80°C in the presence of a dipolar aprotic solvent between a Bis(nitrophthalimide) of formula III, and at least an equal molar amount of an alkali metal diphenoxide and,
2. recovering a polyetherimide from the resulting reaction mixture, where said alkali metal diphenoxide is the dry powder reaction product of a sodium alkoxide and a dihydric phenol in the presence of a $C_{(1-3)}$ alkanol.

A significant advantage of the present invention is that the preformed anhydrous alkali metal diphenoxide reaction product can be used in excess amounts with the bis(nitrophthalimide) without a detrimental reduction in intrinsic viscosity. Unlike most step-growth polymerization reactions involving two bifunctional reactants, it is not critical to weigh either of the two reactants precisely provided that a small excess of alkali metal diphenoxide is used. This permits rapid weighing, lessens the need for quantitative transfer to the reaction vessel and reduces exposure to air and moisture.

The use of an alkali metal hydroxide to make an alkali metal diphenoxide results in the production of water. The presence of water during polyetherimide polymerization can contribute to reduced intrinsic viscosity of the polyetherimide. As shown by Heath and Wirth, Ser. No. 177,164, filed Sept. 1, 1971, and assigned to the same assignee as the present invention, removal of water from alkali diphenoxide can be effected by azeotroping benzene from a reaction mixture of diphenoxide, sodium hydroxide, dimethyl sulfoxide and benzene. However, those skilled in the art know that trace amounts of water which can be complexed with the alkali diphenoxide can remain. An advantage of the present process is the fact that water is not a biproduct. The methanol which is produced is conveniently removed from the alkali metal diphenoxide by drying to a temperature of up to about 100°C. Thus a high temperature drying sequence with the alkali metal diphenoxide in contact with dimethylsulfoxide is not required. Undesirable side reactions are accordingly avoided, and reduced reaction times are achieved.

A preferred method for making the anhydrous alkali diphenoxide preform used in the practice of the invention can be made by the following procedure:

There was added 0.580 part of sodium metal to about 75 parts of anhydrous methanol with stirring under a nitrogen atmosphere. When the sodium finished reacting, 2.875 parts of 2,2-bis(4-hydroxyphenyl)propane was added to the sodium methoxide along with about 75 parts of toluene and the excess solvent was stripped from the mixture. There was obtained a white powder. The white powder was further dried at 100°C at < 1 torr for an hour. In addition to methanol, there also can be employed alkanols such as ethanol, propanol and isopropanol.

In the practice of the invention, reaction is effected between the bis(nitrophthalimide) or "dinitrobisimide" and the alkali diphenoxide in the presence of an aprotic dipolar organic solvent.

It has been found that optimum results are achieved if reaction between the dinitrobisimide and the alkali diphenoxide is conducted under substantially anhydrous conditions. An inert gas atmosphere, such as a nitrogen atmosphere can be used. A temperature in the range of between 25°C to 80°C can be employed, while it is preferred to use 40°C to 60°C.

Substantially equal molar amounts of dinitrobisimide and alkali diphenoxide can be employed. If desired, excess alkali diphenoxide can be used without adverse results such as premature chain-stopping and reduced intrinsic viscosity.

Dipolar aprotic solvents which can be used are, for example, N,N-dimethylformamide, N-methylpyrrolidone, N-methylacetamide, dimethyl sulfoxide and hexamethylphosphoric triamide. Cosolvents such as toluene, benzene, xylene, chlorobenzene, methylene chloride, dichlorobenzene and bromobenzene also can be used.

Stirring of the reaction mixture or other means of agitation can be employed to facilitate production of polyetherimide.

The polyetherimides made in accordance with the practice of the invention can be employed in injection molding applications and blended with various fillers such as fume silica, glass fibers, etc.

In order that those skilled in the art will be better able to practice the invention, the following examples are given by way of illustration and not by way of limitation. All parts are by weight.

EXAMPLE 1

A series of dinitrobisimides were prepared using 3-nitrophthalic anhydride, 4-nitrophthalic anhydride, and a mixture of 3- and 4-nitrophthalic anhydrides. There was added with stirring to respective solutions of the aforementioned nitrophthalic anhydrides in glacial acetic acid, either bis(4-aminophenyl) ether or bis(4-aminophenyl)-methane utilizing sufficient diamine to provide from 2.00-2.05 moles of anhydride per mole of diamine. The anhydride diamine mixtures were refluxed from 2 to 12 hours. The resulting dinitrobisimides were respectively allowed to crystallize from solution and collected on filter paper. The crystallized products were washed with glacial acetic acid and dried in a vacuum oven at 16 to 20 torr for 4 to 12 hours at 80° to 120°C.

The sodium salt of 2,2-bis(4-hydroxyphenyl)-propane or bisphenol-A, was prepared by the aqueous sodium hydroxide method, or "NaOH" and by the method of the invention, or "NaOCH$_3$."

Various polyetherimides (PEI) were prepared by using the above-described dinitrobisimides with the sodium salt of bisphenol-A prepared by both the NaOH and NaOCH$_3$ method.

The following is a description of the preparation of PEI using the NaOH method.

A mixture of 2.2828 g (0.010 mole) of bisphenol-A, 0.8 g (1.5904 g, 50.3% aqueous solution, 0.02 mole) sodium hydroxide, 20 ml dimethylsulfoxide, and 6 ml benzene was stirred in a nitrogen atmosphere at reflux over a Dean Stark trap for 6 hours and the benzene was distilled. The mixture was cooled to 40°C and 5.845 g (0.010 mole), 4,4'-bis(3-nitrophthalimido)diphenylmethane and 30 ml dry dimethyl sulfoxide were added. After 40 min. reaction at 40°C., the reaction was quenched by adding 0.2 ml glacial acetic acid and the mixture was added to 600 ml methanol.

The product, which separated as a fine white granular solid, was isolated by filtration, washed with water and methanol and dried "in vacuo" at 60°C to give 6.8 g (100 percent yield) of polymer.

The following illustrates the NaOCH$_3$ method for making PEI:

There was added 4.7943 parts of bisphenol-A under nitrogen to a solution of sodium methoxide which was formed from 0.9661 part of sodium and 100 parts of anhydrous methanol. The solution was evaporated to dryness on a rotary evaporator and heated to 100°C at 10 torr for one hour. There was added 11.5185 parts of bis(3-nitrophthalimido)diphenyl methane to the aforementioned sodium salt of bisphenol-A along with 53 parts of dry dimethylformamide. The resulting mixture was stirred under nitrogen at 50°C for three hours. There was added dropwise 19 parts of the aforementioned reaction mixture to 500 parts of methanol and the resulting precipitate was reprecipitated from chloroform into methanol and dried.

The PEI made by reacting the bisphenol alkali metal salts using the above-described NaOH and NaOCH$_3$ methods with the above-described dinitrobisimides was evaluated for intrinsic viscosity in dimethylformamide at 25°C. Based on extensive tests with PEI, it was found that unless the intrinsic viscosity in dimethylformamide at 25°C was greater than 0.3, and preferably about 0.35 to about 0.6, that the elongation at break of injection molded samples were unsatisfactory. The following table shows the results obtained where NaOH, NaOCH$_3$ and PEI, have been previously defined, "anhydride" signifies the nitrophthalic anhydride isomer, ODA is bis(4-aminophenyl)ether, MDA is bis(4-aminophenyl)methane and "IV" is intrinsic viscosity in dimethylformamide at 25°C.

| Bisimide | | IV of PEI | |
| --- | --- | --- | --- |
| Anhydride | Amine | NaOH | NaOCH$_3$ |
| 3 | ODA | 0.26–0.33 | 0.52 |
| 3 | MDA | 0.28–0.32 | 0.57 |
| 4 | ODA | 0.23–0.32 | 0.45 |
| 4 | MDA | 0.26 | 0.40 |

-Continued

| Bisimide | | IV of PEI | |
|---|---|---|---|
| Anhydride | Amine | NaOH | NaOCH$_3$ |
| 3,4[a] | MDA | — | 0.49 |

[a]The bisimide was prepared from an equimolar mixture of 3, and 4, - nitrophthalic anhydrides.

The low molecular weight polymer from MDA and the 3-anhydride with IV 0.32 had an ultimate elongation of 3% whereas the polymer with an IV of over 0.4 had a value of 15%. Although the polymer from ODA and the 3-anhydride showed higher elongations, the higher IV showed improved elongation. With an IV of about 0.33, its elongation was 12%, while with an IV over 0.4, its value was 23%.

The above results establish that the use of the alkali diphenoxide as a preformed reactant in accordance with the invention, can be employed with various dinitrobisimide to produce polyetherimide having an intrinsic viscosity in dimethylformamide at 25°C of greater than 0.3.

Although the above examples are limited to only a few of the very many polyetherimides which can be made by the practice of the invention, it should be understood that the present invention is directed to the use of bis(nitrophthalimide) of formula III.

What we claim as new and desire to secure by Letters Patent of the United States is:

1. A method for making polyetherimide which comprises,
   1. effecting reaction at temperatures up to 80°C in the presence of a dipolar aprotic solvent between a bis-(nitrophthalimide) of the formula,

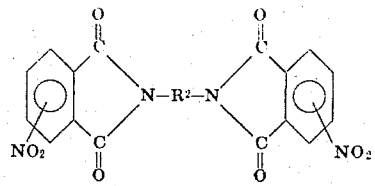

where R$^2$ is a divalent aromatic radical, and at least an equal molar amount of an alkali metal diphenoxide to form polyetherimide,
   2. effecting the precipitation of the polyetherimide from the resulting reaction mixture, and
   3. recovering the polyetherimide from (2), where said alkali metal diphenoxide is the dry powder reaction product of a sodium alkoxide and a dihydric phenol in the presence of a C$_{(1-3)}$ alkanol.

2. A method in accordance with claim 1, where the alkali metal diphenoxide is the sodium salt of 2,2-bis-(4-hydroxyphenyl)propane.

3. A method in accordance with claim 1, where the bis(nitrophthalimide) is the reaction product of an organic aromatic diamine and 4-nitrophthalic anhydride.

4. A method in accordance with claim 1, where the bis(nitrophthalimide) is the reaction product of aromatic diamine amd 3-nitrophthalic anhydride.

5. A method in accordance with claim 1, where the bis(nitrophthalimide) is the reaction product of aromatic diamine and mixture of 3- and 4-nitrophthalic anhydride.

6. A method in accordance with claim 3, where the aromatic diamine is bis(4-aminophenyl)ether.

7. A method in accordance with claim 3, where the aromatic diamine is bis(4-aminophenyl)methane.

* * * * *